US006875897B1

(12) United States Patent
Lange et al.

(10) Patent No.: US 6,875,897 B1
(45) Date of Patent: Apr. 5, 2005

(54) METHOD FOR PRODUCING POLYISOBUTENYLPHENOLS

(75) Inventors: Arno Lange, Bad Dürkheim (DE); Hans Peter Rath, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/381,374

(22) PCT Filed: Sep. 27, 2001

(86) PCT No.: PCT/EP01/11209

§ 371 (c)(1),
(2), (4) Date: Mar. 25, 2003

(87) PCT Pub. No.: WO02/26839

PCT Pub. Date: Apr. 4, 2002

(30) Foreign Application Priority Data

Sep. 28, 2000 (DE) .......................................... 100 48 150

(51) Int. Cl.$^7$ ............................................ C07C 407/00
(52) U.S. Cl. ...................... 568/792; 568/790; 568/793; 568/794
(58) Field of Search ................................ 568/792, 790, 568/793, 794

(56) References Cited

U.S. PATENT DOCUMENTS

| 4,238,628 A | 12/1980 | Cahill et al. |
| 4,429,099 A | 1/1984 | Kennedy et al. |
| 5,300,701 A | 4/1994 | Cherpeck |

FOREIGN PATENT DOCUMENTS

| EP | 831 141 | 3/1998 |
| GB | 1159368 | 7/1969 |
| WO | 94/14739 | 7/1994 |

OTHER PUBLICATIONS

Polym.Bul.8,563–570(1982) Guhaniyogi et al.
J.Polym.Sci,A, vol. 31, 1923–1939(1993) Jamois et al.
Maenz, Angew.Makromol.Chem., vol. 242, pp183–197(1996).

*Primary Examiner*—Michael L. Shippen
(74) *Attorney, Agent, or Firm*—Novak, Druce & Quigg, LLP

(57) ABSTRACT

Polyisobutenylphenols are prepared by alkylating an aromatic hydroxy compound with substantially monoethylenically unsaturated and substantially homopolymeric polyisobutenes in the presence of a Lewis acid alkylation catalyst by a process in which an ether is additionally used as a cocatalyst, the ether having a molecular weight of at least 102 g/mol in the case of $BF_3$ as the Lewis acid.

11 Claims, No Drawings

METHOD FOR PRODUCING POLYISOBUTENYLPHENOLS

The present invention relates to a process for the preparation of polyisobutenylphenols by alkylating an aromatic hydroxy compound with substantially homopolymeric polyisobutenes in the presence of a Lewis acid alkylation catalyst.

It is known that aromatic hydroxy compounds can be alkylated with polyolefins using acid catalysts for the preparation of polyalkenylphenols. This Friedel-Crafts alkylation does not as a rule lead to pure monoalkylation products since the alkylated products are more reactive than the unsubstituted starting materials. A mixture of different mono-, di- and polyalkylation products is therefore generally formed. Moreover, when high molecular weight alkylating agents are used, fragmentation reactions frequently occur both in the polyolefin and in the alkylated product, so that as a rule a product mixture having a complex composition is obtained.

Such mixtures are unsuitable for many industrial applications. Rather, products of defined composition are required, frequently monoalkylation products, it also being possible for the position of the alkylation to be relevant.

For example, polyisobutenylphenol is an important starting material for the preparation of fuel detergents and is itself used as a fuel additive. It is advantageous if the phenol is substantially monoalkylated and/or substituted in the para position.

In order to increase the proportion of monoalkylation products, the prior art proposes using the phenol component in a large excess. The disadvantage of this process measure is the necessary removal of large amounts of unconverted phenols from the product mixture obtained.

GB-A-1 159 368 discloses the alkylation of phenol with monoolefinic polymeric alkylating agents having molecular weights of from 700 to 300 000 using boron trifluoride phenolate.

U.S. Pat. No. 4,238,628 discloses a process for alkylating benzene, phenol and naphthol with polyolefins of monomers having at least three carbon atoms, preferably polybutene, in the presence of boron trifluoride as a catalyst. Before the alkylation reaction, the olefin polymer must be reacted with ethylene in order to obtain a substantial ethylene termination. The yield of alkylphenol is only from 44 to 64%.

U.S. Pat. No. 4,429,099 discloses the alkylation of phenol or substituted phenols with bis(polyisobutene)benzene or tris(polyisobutene)-benzene having molecular weights of from about 700 to 50 000 and from about 1 000 to 75 000, respectively. The catalysts disclosed are $AlCl_3$, $AlBr_3$, $BF_3$, $BF_3O(C_2H_5)_2$, $TiCl_4$, $SnCl_4$, $AlC_2H_5Cl_2$, $FeCl_3$, $SbCl_5$ and $SbF_5$. The polyisobutenes are vinylidene-terminated. A large excess of phenol is used, and long reaction times are required.

WO-A-94/14739 describes a process for the preparation of polyisobutenylhydroxy aromatics. In the process, a hydroxy aromatic compound, e.g. phenol, catechol, resorcinol, hydroquinone or pyrogallol, is reacted with polyisobutene having a number average molecular weight of from 300 to 5 000 in the presence of an acidic alkylation catalyst. Here, it is necessary for the polyisobutene (PIB) to contain at least 70% of terminal vinylidene units ($\alpha$-olefin). The PIB:phenol ratio should vary within the limits of from 1:1.2 to 1:5. However, ratios of from 1:2 to 1:3 are preferred and, in the examples disclosed, phenol is used throughout in a 100% excess (1:2). Without the evidence of a working example, it is asserted that the polyisobutenyl-phenols obtained would have from 70 to 100% para-substitution, whereas polyisobutenephenols prepared from conventional polyisobutene with a low $\alpha$-olefin content (low vinylidene polyisobutenes=from 2 to 6% $\alpha$-olefin content within the meaning of WO 94/14739) would have only from 0 to 40% para-substitution. This contradicts the experimental findings of EP-A-0 831 141. Example 1 of this document, in terms of the nature and amount of the starting materials (especially the highly reactive polyisobutene employed), catalyst employed, the solvent and the reaction time and reaction duration, corresponds to example 1 of WO-A-94/14739. Nevertheless, only a polyisobutenylphenol with 67% para-substitution is obtained. Here, the common teaching that highly reactive PIB leads to a high byproduct fraction is confirmed.

J. Polym. Sci. A, 31, S. (1993), 1938 describes the use of $SnCl_4$ as a catalyst. Here too, phenol is used in a large excess.

Kennedy, Guhaniyogi and Percec (Polym. Bull. 8, 563 (1970)) describe the use of $BF_3$ diethyletherate as an alkylation catalyst, the PIB:phenol ratio being 1:2.5 or 1:1.7 (based in each case on the polyisobutenyl terminal groups).

A common feature of the processes known to date for the alkylation of hydroxy aromatic compounds with polyolefins is that they have at least one and as a rule a plurality of the following disadvantages:

large excesses of phenol and/or amounts of catalyst are required, the polyolefin used must contain a high proportion of $\alpha$-olefin terminal units, fragmentation reactions of the polyolefin or of the alkylated product take place, undesirable byproducts, such as polyalkylation products or products alkylated in an undesirable position, are also obtained, the reaction times are long.

None of the abovementioned documents describes the use of Lewis acid alkylation catalysts in combination with ethers (determined in the case of $BF_3$) as cocatalysts.

It is an object of the present invention to provide an improved process for alkylating aromatic hydroxy compounds. As far as possible with respect to the starting materials, preferably predominantly monoalkylation products should result, it being possible to dispense with a large excess of the phenol component. In the alkylation reaction, preferably substantially no fragmentation reactions of the polyalkene or of the alkylated product should take place. If possible products alkylated preferably para to the OH function should result. In particular, the process should also be suitable for alkylating polyalkenes which have a relatively large proportion of non-$\alpha$ double bonds.

We have found, surprisingly, that this object is achieved by an alkylation process in which the reactivity is reduced by suitable measures. This can be effected on the side of the Lewis acid alkylation catalyst by using it in combination with an ether (determined in the case of $BF_3$) as a cocatalyst.

The present invention relates to a process for the preparation of polyisobutenylphenols by alkylating an aromatic hydroxy compound with substantially monoethylenically unsaturated and substantially homopolymeric polyisobutenes in the presence of a Lewis acid alkylation catalyst, wherein in addition an ether is used as a cocatalyst, the ether having a molecular weight of at least 102 g/mol in the case of $BF_3$ as the Lewis acid.

In the context of this application, Lewis acid alkylation catalysts are understood as meaning both individual acceptor atoms and acceptor atom-ligand complexes, molecules, etc., provided that they have overall (external) Lewis acid (electron acceptor) properties. Preferred catalysts are the halides of boron, aluminum, tin or a transition metal, preferably titanium and iron. $BF_3$, $SnCl_4$, $TiCl_4$ and $FeCl_3$ are particularly preferred.

According to the invention, the alkylation catalysts (Lewis acids) are used together with at least one ether as a cocatalyst. In the case of $BF_3$, this ether must have a molecular weight of at least 102 g/mol. Ethers having a molecular weight of at least 102 g/mol are in general the preferred embodiment. The molecular weight of the ethers is particularly preferably from 102 to 242 g/mol.

Ethers suitable as cocatalysts and having a molecular weight of less than 102 g/mol are, for example, dimethyl ether, ethyl methyl ether and diethyl ether. Ethers preferred as cocatalysts are selected from symmetrical and asymmetrical ethers which have two hydrocarbon radicals of 6 to 16 carbon atoms in total. These hydrocarbon radicals may be aliphatic, cycloaliphatic or aromatic radicals. Cyclic ethers in which the ether group is part of the ring are also suitable. $Di(C_3–C_8)$alkyl ethers, such as di-n-propyl ether, diisopropyl ether, methyl tert-butyl ether and isopropyl tert-butyl ether, tetrahydrofuran, $di(C_5–C_8)$cycloalkyl ethers, such as dicyclohexyl ether and ethers having at least one aromatic hydrocarbon radical, such as anisole, are preferred.

The aromatic hydroxy compound used for the alkylation is preferably selected from phenolic compounds having 1, 2 or 3 OH groups, which may have at least one further substituent. Preferred further substituents are $C_1–C_8$-alkyl, in particular methyl and ethyl. In particular, compounds of the formula

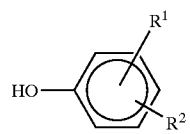

where $R^1$ and $R^2$, independently of one another, are each hydrogen, OH or $CH_3$, are preferred. Phenol, the cresol isomers, catechol, resorcinol, pyrogallol, fluoroglucinol and the xylenol isomers are particularly preferred. In particular, phenol, o-cresol and p-cresol are used. If desired, mixtures of the abovementioned compounds may also be used for the alkylation.

In the context of this invention a substantially homopolymeric polyisobutene is understood as meaning a polyisobutene which comprises more than 90% by weight of isobutene units. Suitable comonomers are $C_3–C_6$-alkenes, preferably n-butene. The preparation and structure of the oligoisobutenes/polyisobutenes are known to a person skilled in the art (e.g. Günther, Maenz, Stadermann in Ang. Makrom. Chem. 234, (1996) 71). Homopolyisobutenes having a number average molecular weight of from about 300 to 5 000 are particularly preferred. Particularly preferred molecular weight ranges are from 400 to 3 000, in particular from 500 to 2 500. The polydispersity PD of the polyolefins is preferably from 1.05 to 3.0. However, it can if desired also be higher, for example greater than 5 or even greater than 12.

The novel process is advantageously suitable both for the alkylation of polyisobutenes which have a high content, for example at least 85 mol %, of α double bonds and in particular for the alkylation of polyisobutenes which have a lower content of α double bonds. Thus, the novel process also permits the use of industrially available polyisobutene mixtures for the alkylation. Advantageously, the disadvantages known from the prior art and in particular fragmentation reactions generally do not occur.

Polyisobutenes which contain at least 70, particularly preferably at least 80, especially at least 85, mol % of α and/or β double bonds are preferably used for the alkylation.

Polyisobutenes which, if desired, may contain up to 10% of n-butene incorporated as a comonomer are preferably used. Such polyisobutenes are prepared, for example, from butadiene-free $C_4$-cuts, which, as a rule, also contain n-butene in addition to isobutene as a result of the production. Isobutene homopolymers are particularly preferred.

Preferred polyisobutenes are highly reactive polyisobutenes, which are distinguished from the low-reactivity polyisobutenes by the content of double bonds in the α- or β-position. Particularly suitable highly reactive polyisobutenes are, for example, the Glissopal® grades from BASF AG, for example Glissopal® 1000 (number-average molecular weight $M_n$=1 000) and Glissopal V 33 ($M_n$=550), which have double bonds predominantly in the α-position. Polyisobutenes which are terminated to an extent of at least 70 mol % with methylvinylidene groups (—C(—$CH_3$)=$CH_2$) and/or dimethylvinyl groups (—CH=C($CH_3$)$_2$) are particularly preferred.

In the novel process, catalyst and cocatalyst are preferably used in a molar ratio of from 1:10 to 10:1.

Advantageously, the novel process permits the substantially selective monoalkylation of aromatic hydroxy compounds without very large excess amounts of aromatic hydroxy compound having to be used, as described in the prior art. Preferably, aromatic hydroxy compounds and polyalkenes are used in a molar ratio of from 1.5:1 to 1:1, particularly preferably from 1.2:1 to 1:1. Specifically it is possible to use aromatic hydroxy compounds and polyalkene in substantially equimolar ratios, such as from 1.1:1 to 1:1, more especially from 1.05:1 to 1:1. An excess of the aromatic hydroxy compound of 100% or more, however, is of course also suitable. The novel process generally gives polyalkenylphenols which (if the starting material used permits polyalkylations) have a degree of polyalkylation with the polyalkene of not more than 20, preferably not more than 10, in particular not more than 5, mol %.

As a rule, from 1 to 30 mol %, based on the polyolefin, of catalyst or catalyst/cocatalyst complex are used. In specific cases, larger amounts such as 50 mol % or 80 mol % can provide advantages, for example a higher rate of reaction. The complexes can have been produced beforehand or are prepared in situ. The novel Lewis acids, as such or in an inert solvent, are combined with one or more ethers.

The novel process can advantageously be carried out as a rule in the absence of a solvent. In some cases, however, the use of a hydrocarbon, such as n-alkane, or a mixture of said hydrocarbons as a solvent is advantageous. Owing to the low reactivity of the catalyst/olefin complex alkyl aromatics or mixtures thereof may also be used. Aromatics, such as toluene, ethylbenzene, o-xylene, m-xylene, p-xylene, the isomeric trimethylbenzene or mixtures thereof (e.g. the mixtures sold by Exxon Company as "aromatic 100" or "aromatic 150"), are particularly advantageously used here, it being possible for further reaction stages to take place or the product being marketed.

The alkylation is preferably carried out at from −10° C. to +100° C. The exact reaction temperatures are dependent, inter alia, on the catalyst used. A particularly preferred temperature range is from 15 to 60° C., in particular from 15 to 40° C. The reaction is usually carried out at atmospheric pressure but may also be carried out at superatmospheric or reduced pressures.

The order of the addition of the reaction components is in principle unimportant. For example, the hydroxy aromatic compound can be initially taken as such or in solution, the catalyst as such, as an adduct or as a mixture with an ether can be added and finally the polyolefin, likewise as such or in solution, can be added. Alternatively, the hydroxy aromatic compound can also be initially taken together with the polyolefin, and the Lewis acid added. The reaction can be stopped by means of a base, for example ammonia solution. After washing with water, the organic phase is generally dried by conventional methods, for example over sodium sulfate or magnesium sulfate, and the solvent is removed.

Some particularly preferred reaction systems are mentioned below:

$BF_3$ and complexes

A polyisobutylene having a vinylidene content which may be less than or more than 70% (e.g. less than 50%, 40%, 80%) is reacted with phenol, ortho-cresol or para-cresol using $BF_3$ as a catalyst, with or without corresponding cocatalysts, to give polyisobutenylphenol or polyisobutenylcresol. Examples are the $BF_3$ complexes with phenol or ethers, such as $(n-C_3H_7)_2O$, $(i-C_3H_7)_2O$, $t-C_4H_9—O—CH_3$, $t-C_4H_9—O-i-C_3H_7$, tetrahydrofuran, dicyclohexyl ether or anisole.

$SnCl_4$, $FeCl_3$, $TiCl_4$ and their complexes

A homopolyisobutylene having a vinylidene content which may be less than or more than 70% (e.g. 30, 50 or 80%) is reacted with phenol, ortho-cresol or para-cresol using $SnCl_4$, $FeCl_3$ or $TiCl_4$ as the Lewis acid catalyst, with or without corresponding cocatalysts to give polyisobutenylphenol or polyisobutenylcresol. $SnCl_4$ complexes, $FeCl_3$ complexes and $TiCl_4$ complexes with ethers such as $(n-C_3H_7)_2O$, $(i-C_3H_7)_2O$, $t-C_4H_9—O—CH_3$, $t-C_4H_9—O-i-C_3H_7$, tetrahydrofuran, dicyclohexyl ether or anisole are preferably used.

Complexes with ethers in a molecular weight range M from 102 to 242, such as $(n-C_3H_7)_2O$, $(i-C_3H_7)_2O$, $t-C_4H_9—O—CH_3$, $t-C_4H_9—O-i-C_3H_7$, dicyclohexyl ether or anisole, should be particularly singled out. A homopolymer of isobutene which comprises at least 90% (e.g. 95%) of isobutene units and which in total is α- or β-olefin terminated to an extent of at least 80% can be particularly uniformly reacted therewith. Thus, uniform 4-polyisobutenyl-phenols, 2-methyl, [sic] 4-polyisobutenylphenols or 4-methyl, [sic] 2-polyisobutenylphenols are obtained with only small excess amounts (e.g. 5 or 15%) of phenol, o-cresol or p-cresol. These contain less than 20, generally less than 10 or 5, mol % of more highly substituted isomers, for example the disubstitution products. Larger excess amounts of phenol or cresol are possible and lead to an even higher content of 4-isobutenylphenol (from phenol or ortho-cresol) or 2-isobutenylphenol (from para-cresol) in the product.

When $BF_3$ and complexes thereof are used, the reaction is preferably carried out at from −10 to 50° C. Alkylation can be particularly easily effected at from 15 to 40° C. The reaction is preferably carried out at from −10 to 100° C. in the case of $SnCl_4$ and $FeCl_3$ and complexes thereof, and at from −10 to 80° C. in the case of $TiCl_4$ and complexes thereof. In these cases, alkylation can be particularly easily effected at from 15 to 60° C.

The polyisobutenylphenols obtained by the novel process are suitable for a large number of industrial applications and in particular as fuel additives and as intermediates for the preparation of fuel detergents.

The present invention furthermore relates to a process for the preparation of functionalized polyisobutenylphenols, comprising:

i) the preparation of polyisobutenylphenols by alkylating an aromatic hydroxy compound with substantially monoethylenically unsaturated polyisobutenes in the presence of a Lewis acid alkylation catalyst, as described above, and ii) the functionalization of the polyisobutenylphenols obtained in step i) by aminoalkylation and/or polyether formation.

Suitable processes for the preparation of polyisobutenylphenol-containing Mannich adducts are known to a person skilled in the art and are described, for example, in EP-A-0 831 141 and the unpublished German patent application P 199 48 114.8. The pertinent parts of the European application, and an English language translation of the specification part of the German application are reproduced subsequent to Example 3.

The examples which follow illustrate the invention without restricting it.

Example 1

In a four-necked flask, 28 g of phenol are partially dissolved in 10 ml of toluene. 6.3 ml of a $BF_3$-diisopropyl ether adduct are added dropwise and 250 g of polyisobutene (Mn=1 000, content of methylvinylidene terminal group is 80%) dissolved in 100 ml of toluene are added dropwise at from 20 to 25° C. Stirring is continued for 4 hours at 25° C. The reaction is stopped with 100 ml of 5% ammonia solution. The organic phase is washed with water and dried over $NaSO_4$ [sic] and evaporated down in a rotary evaporator:

230 g of oil (PIB phenol)

NMR:

7.2 ppm (doublet, 2H), 6.7 ppm (doublet, 2H), 4.8 ppm (singlet, 1H), 1,75 ppm (singlet, 2H), 1.5–0.5 ppm (singlet, 140H)

This corresponds to an Mn of the alkyl radical of 1 000.

In the signal range from 7.1 to 6.75 ppm, there are small signals which may represent from 5 to 10% of 2- or 2,4-substituted phenol.

Example 2

200 g of polyisobutene (Mn=1 000, content of methylvinylidene terminal group is 80%), 50 ml of hexane and 23 g of phenol are initially taken in a four-necked flask. A mixture of 20 ml of hexane, 5.2 g of $SnCl_4$ and 2 g of diisopropyl ether is run in. Stirring is then effected for 5 hours at 30° C. The batch is taken up in 200 ml of hexane and washed 3 times with 10% HCl and 3 times with water. The organic phase is dried with $Na_2SO_4$ and evaporated down at 60° C./5 mbar: 214 g of oil

NMR:

7.2 ppm (doublet, 2H), 6.7 ppm (doublet, 2H), 4.8 ppm (singlet, 1H), 1.75 ppm (singlet, 2H), 1.5–0.5 ppm (singlet, 140H)

This corresponds to a para-substituted phenol.

In the signal range from 7.1 to 6.75 ppm there are small signals which may represent from 5 to 10% of 2- or 2,4-substituted phenol.

Example 3

200 g of polyisobutene (Mn=1 000, content of methylvinylidene terminal group is 80%), 50 ml of toluene and 23 g of phenol are initially taken in a four-necked flask. A mixture of 10 ml of hexane, 3.2 g of $FeCl_3$ and 2 g of diisopropyl ether is run in. Stirring is then effected for 5 hours at 30° C. The batch is taken up in 200 ml of hexane and washed 3 times with 10% HCl and 3 times with water. The organic phase is dried with $Na_2SO_4$ and evaporated down at 60° C./5 mbar: 165 g of oil

NMR:

7.2 ppm (doublet, 2H), 6.7 ppm (doublet, 2H), 4.8 ppm (singlet, 1H), 1.75 ppm (singlet, 2H), 1.5–0.5 ppm (singlet, 141H)

This corresponds to a para-substituted phenol.

In the signal range from 7.1 to 6.75 ppm there are small signals which may represent from 5 to 10% of 2- or 2,4-substituted phenol. Accordingly in one aspect the present invention comprises the Mannich reaction product of
a) a polyisobutene-substituted phenol where the ployisobutene is one in which at least 70% of the terminal olefinic double bonds are vinylidene;
b) an aldehyde;
c) ethylene diamine.

A second aspect of the invention provides provides a fuel composition comprising a major amount of hydrocarbon fuel, and from 10 to 1000 ppm of the above reaction product.

Polyisobutenes (PiBs) in which at least 70% of the terminal olefinic double bonds are of the vinylidene type are commonly known as "high reactive" polyisobutenes, as distinct from "low reactive" PiBs (having a lower proportion of vinylidene terminal double bonds) which are commonly used. Examples of "high reactive" polyisobutenes include Ultravis® marketed by BP Chemicals and Glissopal@ marketed by BASF. The compounds of the invention, derived specifically from ethylene diamine and a PiB phenol in which the PiB is highly reactive, are surprisingly superior in performance to known fuel detergents based on Mannich chemistry.

Preferably the PiB has a number average molecular weight of from 700 to 2300, particularly from 750 to 1500. The aldehyde is preferably a ($C_1$–$C_6$) aldehyde, most preferably formaldehyde.

As mentioned above, the compounds of the invention are made by a Mannich reaction; the conditions required for Mannich reactions are well known in the art. Another aspect of the invention provides a process for producing a compound as defined above, comprising reacting together an polyisobutene phenol, an aldehyde, and ethylene diamine under conditions suitable for a Mannich condensation reaction.

EXAMPLE 1

Preparation of polyisobutene-substituted phenol 203.2 g (2.16 mol) of phenol was melted at 40° C. and added to boron trifluoride etherate (73.5 ml, 0.60 mol) in a 5 liter round bottomed flask. Ultravis® 10 (1040 g, 1.09 mol), a "highly reactive" polyisobutene (PiB) (Mw=1000), was dissolved in hexane (1863 ml) and the solution added to the flask containing the phenol via a pressure equalising dropping funnel, at a rate suf-ficient to maintain the temperature of the reaction mixture at 22–27° C. This took three hours. The solution was stirred for a further 16 hours at room temperature before ammonia (400 ml of 30% w/w aqueous, 2.88 mol) was added. The solution turned a deep blue colour. 1000 ml of water was added and the mixture stirred, after which it was separated in a five liter separating funnel and the aqueous layer extracted with 4×500 ml hexane. The organic layers were combined and dried over $MgSO_4$ overnight, then fil-tered through a 12 mm Celite pad. The solvent was removed from the filtrate at 80° C./23"Hg on a rotary evaporator. The product was found to comprise polyisobutene-substituted phenol with a para to ortho ratio of about 3:1.

EXAMPLE 2

Preparation of adduct of polyisobutene-substituted phenol and ethylene diamine

The polyisobutene-substituted phenol of Example 1 (300 g, 0.295 mol), paraformaldehyde (8.86 g, 0.295 mol) and toluene (100 g, solvent) were charged to a round-bottomed flask and heated rapidly to 100° C., 17.73 g (0.295 mol) of ethylene diamine (EDA) was then added over 5 minutes via a pressure equalising dropping funnel. The reaction was heated to 126° C. for four hours and 5.5 ml water collected: the reaction was then refluxed at 125° C. for three hours. The product was transferred to a one liter Floren-tine flask and the solvent removed on a rotary evaporator at 80° C./29.5"Hg. A cloudy brown residue was filtered through a 12 mm Celite pad to yield a clear golden viscous liquid. Analysis re-vealed 1.68% nitrogen, alkalinity value of 70.04 mg KOH $g^{-1}$, 3 ppm residual chlorine.

We claim:

1. A process for the preparation of polyisobutenylphenols by alkylating an aromatic hydroxy compound with substantially monoethylenically unsaturated and substantially homopolymeric polyisobutenes in the presence of a Lewis acid alkylation catalyst, wherein in addition an ether is used as a cocatalyst, the ether having a molecular weight of at least 102 g/mol in the case of $BF_3$ as the Lewis acid.

2. A process as claimed in claim 1, wherein the catalyst is selected from the halides of boron, aluminum, tin or a transition metal.

3. A process as claimed in claim 2, wherein the catalyst is selected from $BF_3$, $SnCl_4$, $TiCl_4$ and $FeCl_3$.

4. A process as claimed in claim 1, wherein the ether has a molecular weight of from 102 to 242 g/mol.

5. A process as claimed in claim 1, wherein catalyst and cocatalyst are used in a molar ratio of from 1:10 to 10:1.

6. A process as claimed in claim 1, wherein aromatic hydroxy compounds and polyalkylenes are used in a molar ratio of from 1.5:1 to 1:1.

7. A process as claimed in claim 1, wherein the polyisobutenylphenols obtained are polyalkylated with the polyisobutene to a degree of not more than 20 mol %.

8. A process for the preparation of polyisobutenylphenols by alkylating an aromatic hydroxy compound with substantially monoethylenically unsaturated and substantially homopolymeric polyisobutenes in the presence of a Lewis acid alkylation catalyst, wherein in addition an ether is used as a cocatalyst, the ether having a molecular weight of at least 102 q/mol in the case of $BF_3$ as the Lewis acid, and which further comprises functionalizing the polyisobutenylphenols by aminoalkylation and/or polyether formation.

9. A process as claimed in claim 6, wherein the molar ratio is from 1.2:1 to 1:1.

10. A process as claimed in claim 7, wherein the polyisobutenylphenols are polyalkylated with the polyisobutene to a degree of not more than 10 mol %.

11. A process as claimed in claim 7, wherein the polyisobutenylphenols are polyalkylated with the polyisobutene to a degree of not more than 5 mol %.

* * * * *